Sept. 16, 1941.  E. J. CLEMONS  2,256,240
MILK CAN OR CONTAINER
Filed Jan. 8, 1940
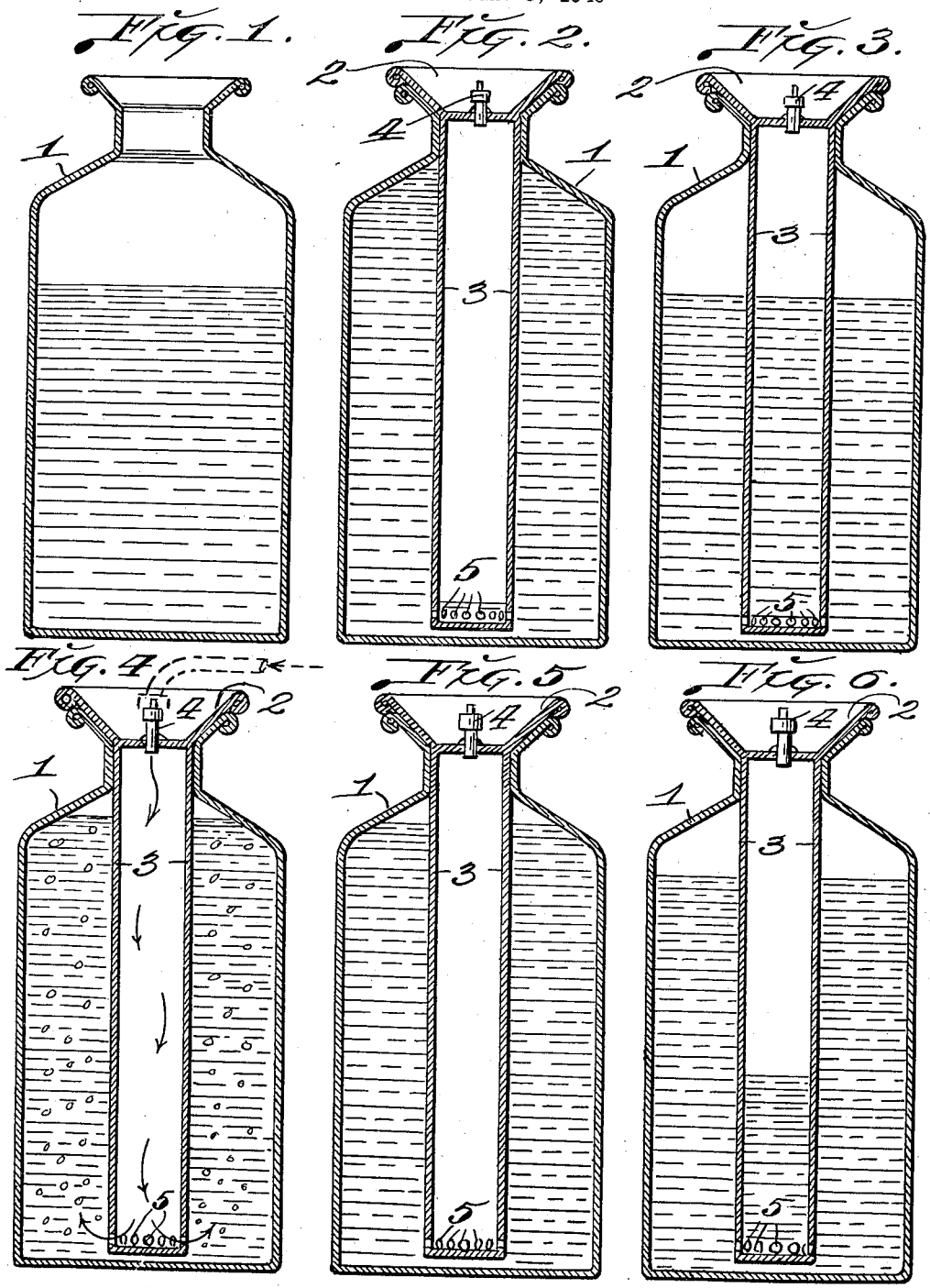
INVENTOR,
Ezra Jay Clemons Patented Sept. 16, 1941

2,256,240

UNITED STATES PATENT OFFICE 2,256,240

MILK CAN OR CONTAINER

Ezra Jay Clemons, Los Angeles, Calif.

Application January 8, 1940, Serial No. 312,802

1 Claim. (Cl. 31—2)

My invention relates to new and useful improvements in milk cans or containers for the transportation of milk from the cow to the creamery, in a practical and economical manner and the use of which can or container is exceedingly effective in preventing bacterial growth within the milk, due to the use of carbon dioxide which lowers and maintains the decreased pH of the milk, and deprives the milk of the air which is necessary for life of aerobic bacteria. Thus my invention makes it possible to successfully transport raw milk from the cow to the creamery, with a bacterial count of less than 1,500 per cubic centimeter, in contrast to the usual count of 150,000 per cubic centimeter.

I propose to accomplish the desirable results just mentioned by the use of a milk can or container wherein the inner end of the cover of the can or container, is extended to the bottom of said can or container, in the form of a hollow tube, there being an inlet check valve in the cover, and there being numerous holes formed in the wall of the hollow tube to provide a row around the tube, one-half inch from its bottom.

Thus, when fresh milk has nearly filled the can or container directly after being withdrawn from the cow, the cover of the can or container is inserted and secured for air to be released by opening the valve in the cover and allowing pressure of the weight of the height of the body of the milk upon the contents of the tube to displace the air, after which carbon dioxide gas is admitted under pressure until said gas freely bubbles upwardly through the body of the milk outside of the hollow tube and escapes into the atmosphere, leaving the hollow tube filled with carbon dioxide gas that had displaced the milk.

In this manner the carbon dioxide became occluded and united with the water of the milk driving off all of the air from the milk and lowering the pH of that milk. This condition is to be maintained, because as soon as carbon dioxide gas escapes into the atmosphere from the surface of the milk it will become replaced by the absorption of carbon dioxide which has been retained within the hollow of the tube that is under the pressure of the weight of the height of the body of the milk above the bottom of the carbon dioxide within the tube.

Thus it will be seen, that the 15.64 cubic centimeters of air in solution in each 1,000 cubic centimeters of the water of the milk by volume at 30 degrees centigrade, is displaced by 665.00 cubic centimeters of the carbon dioxide. However, owing to the bond between the carbon dioxide and the water being extremely unstable, my invention makes it possible to constantly maintain the supply of carbon dioxide so as to replace that carbon dioxide which is released into the atmosphere, thereby keeping carbon dioxide occluded in the milk and maintaining a lowered pH of said milk.

More specifically I propose to saturate milk with carbon dioxide as soon as it has been withdrawn from the cow, before bacterial growth occurs, and then to maintain that milk saturated with carbon dioxide until the time of its arrival at the creamery. Then the carbon dioxide gas is to be displaced by atmospheric air.

In order to accomplish my object, I take advantage of the physics and chemistry of carbon dioxide and water, and the fact that water has a very great affinity for carbon dioxide but, at the same time, its bond with carbon dioxide is extremely weak. Therefore, the affinity of water of milk for carbon dioxide, causes the milk to absorb and displace the carbon dioxide within the hollow of the tube, owing to the weight of the height of the milk exerting pressure upon the carbon dioxide in the chamber of the tube, as fast as the weak bond between the water of the milk and the carbon dioxide in the milk breaks and allows the escape of carbon dioxide gas to atmosphere. Then all carbon dioxide gas is to be displaced from the milk by atmospheric air.

Hence, it will be seen that my invention consists in the improved milk can or container whereby milk is transported from cow to creamery in a manner so that air is excluded from the milk and the water of the milk is continually kept united with carbon dioxide, thus displacing and keeping air from the milk and, at the same time, bringing about and maintaining a lowered pH of that milk. Then all of the carbon dioxide gas is to be displaced from the milk by atmospheric air.

With the foregoing and other objects in view, my invention consists in certain novel features of construction and arrangement of parts, which will be hereinafter more fully described and claimed and illustrated in the accompanying drawing in which:

Fig. 1 is a vertical section taken through the center of a conventional milk can and showing the same partially filled with milk.

Fig. 2 is a vertical section similar to Fig. 1 and showing the cover and depending tubular extension in position within the can.

Fig. 3 is a vertical section taken through the center of the can and showing the conditions existing after the valve in the cover has been opened to permit the escape of air previously trapped in the depending tubular portion of the cover.

Fig. 4 is a vertical section of the can and its cover and showing the conditions existing while carbon dioxide under pressure is being admitted through the valve in the cover. Or it is a vertical section of the can or container with its submerged chamber showing the condition which exists while atmospheric air is being admitted under pressure through the valve in the said chamber so as to drive off all of the carbon dioxide gas which has been retained within the body of the milk.

Fig. 5 is a vertical section of the can and its cover and showing the conditions existing after the carbon dioxide has been admitted to the depending tubular portion of the cover and with the valve in said cover in closed position.

Fig. 6 is a vertical section of the can and showing the conditions existing after the carbon dioxide within the depending tubular portion of the cover has been partly displaced by the milk and has been occluded into the milk and has loosened its bond with the water of the milk and escaped to atmosphere.

Referring by numerals to the accompanying drawing which illustrates a preferred embodiment of the apparatus, 1 designates the body of the milk can or container which is shaped similar to the conventional milk shipping cans, 2 the cover that fits in the flaring mouth of the can and 3 a tubular member that is carried by the cover and which, when the cover is applied to the mouth of the can, extends downwardly through the neck of the can and terminates adjacent the bottom of the can.

The fit between the cover 2 and between the upper portion of depending tubular member 3 with the mouth and neck of the can is such as to permit air or gas under a low degree of pressure to pass upwardly through the neck of the can to atmosphere.

Seated in the central portion of the cover 2 and communicating with the chamber in depending tubular member 3 is a conventional inwardly opening check valve 4, similar to the check valves used on the inflatable tubes of pneumatic tires and other inflatable structures.

Formed through the wall of the tubular member immediately above its closed lower end is a circumferentially disposed row of apertures 5.

In Fig. 1, the can 1 is shown partially filled with milk that has just been withdrawn from the cow.

The cover 2 is now applied to the mouth of the can with the tubular extension extending downwardly into the body of milk contained within the can and said tubular member containing air that is trapped therein will displace a portion of the milk within the can so as to cause the level of the milk to rise to a point adjacent the neck of the can as illustrated in Fig. 2. Valve 4 is now opened to permit the escape of air from the chamber within tube 3 with the result that a portion of the milk will flow through the apertures 5 into the tubular member 3 and as a result, the level of the body of the milk in the can surrounding the tubular member 3 and the body of milk within said tubular member will coincide so as to occupy the same horizontal plane (see Fig. 3).

Carbon dioxide under a certain degree of pressure is now admitted through valve 4 into the upper portion of the chamber within tubular member 3, thus expelling the milk within the lower portion of said tubular member and consequently causing the body of milk within the can surrounding the tubular member to rise to the level as illustrated in Fig. 4.

The carbon dioxide admitted to the tubular member 3 will discharge outwardly through the apertures 5 and will bubble upwardly through the body of milk within the can as illustrated in Fig. 4, to bond with the water in the milk. Or atmospheric air is admitted to the submerged container to be discharged outwardly through the numerous apertures near its bottom so as to bubble upwardly through the body of the milk within the can or container in order to drive off all of the carbon dioxide gas from within the body of the milk into the atmosphere. Valve 4 is now permitted to close, thereby trapping a considerable volume of carbon dioxide within the tubular member 3, such carbon dioxide being under pressure of the body of milk within the can surrounding the tubular member, such condition being illustrated in Fig. 5, and as the carbon dioxide loosens its bond with the water of the milk it escapes to atmosphere by passing upwardly and outwardly between the neck of the can and the upper portion of tubular member 3. (See Fig. 6.)

Milk treated in my improved can or container is transported to the creamery where it arrives with bacterial growth retarded to a very marked degree, owing to the expulsion of air from the milk and the maintenance of that milk with a decreased pH which retards aerobic bacterial growth, for lack of air, the necessity of life, and because the decrease in the pH of that milk has a marked germicidal effect. Then atmospheric air under pressure is to be admitted through the valve in the upper portion of the submerged chamber so as to drive off all of the carbon dioxide gas which has been retained within the body of the milk which said carbon dioxide gas escapes into the atmosphere.

It is to be understood that minor changes in size, form and construction of my improved milk can or container, may be made and substituted for those herein shown and described, for instance, the principle involved may be incorporated in tank cars that are utilized for the transportation of milk, or in can or container within the creamery for the purpose of treating milk in the forthwith described manner, without departing from the spirit of my invention, the scope of which is set forth in the appended claim.

I claim as my invention:

A milk can having a restricted neck and a combined cover and cylinder, said cylinder extending from the cover, through the neck and substantially to the bottom of the can, said cylinder and restricted neck fitting to provide a fluid escape passage, said cylinder having a valved top, a closed bottom from contact with the bottom of the can and apertures in its side wall substantially at the bottom thereof, said valved top and apertures comprising a conduit for the introduction of a treating fluid, to milk within the can, at least a portion of said treating fluid being permitted to pass through said escape passage, and said cylinder having sufficient volumetric capacity to retain therein, when the valve is closed after the initial treatment of the milk in the can, a sufficient quantity of treating fluid to supplement that which may escape from the treated milk and can during a normal period of storage or shipment.

EZRA JAY CLEMONS.